Figure 1:
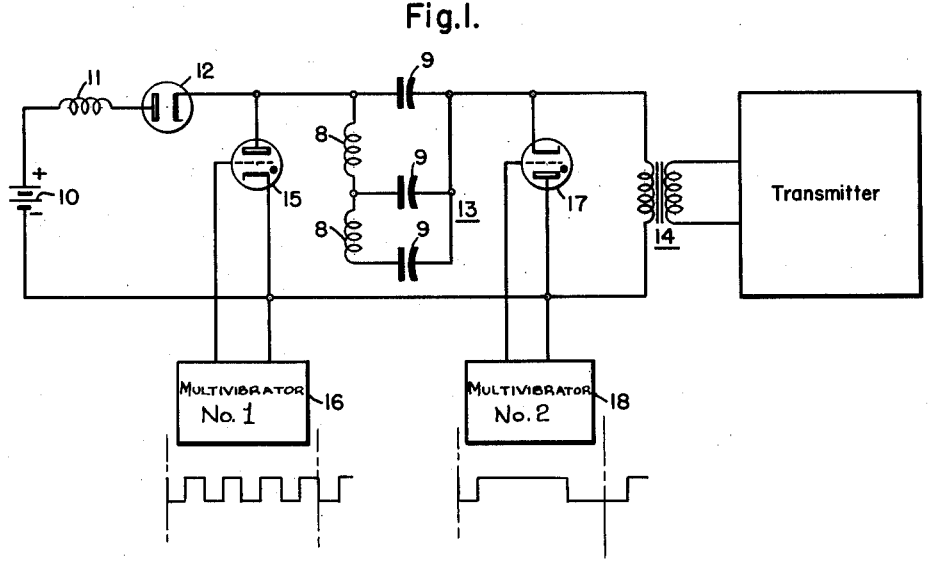

April 27, 1954     A. A. NIMS, JR     2,677,053
PULSE GENERATOR

Filed June 29, 1949

WITNESSES:

INVENTOR
Albert A. Nims, Jr.
BY
ATTORNEY

Patented Apr. 27, 1954

2,677,053

UNITED STATES PATENT OFFICE 2,677,053

PULSE GENERATOR

Albert A. Nims, Jr., Catonsville, Md., assignor to Westinghouse Electric Corporation, East Pittsburgh, Pa., a corporation of Pennsylvania Application June 29, 1949, Serial No. 102,125

12 Claims. (Cl. 250—27)

This invention relates to circuits for the production of high voltage pulses from a low voltage source.

Pulse-forming networks are commonly used in radar systems for supplying pulses to magnetrons in transmitters. One type of network charging circuit which is used, is known as a resonant charging circuit, and employs a direct-current power supply in series with a charging inductance, together with an electronic switch for causing the network to discharge. The charging inductance, and the capacity in the network, are chosen to resonate at a frequency of one-half the desired pulse frequency. When the switch is opened and the direct-current voltage is suddenly applied to the series LC circuit, oscillations are set up. The switch is closed at the end of the first half cycle of oscillation, forming a pulse when the voltage across the capacity is at its maximum value which is about twice the supply voltage.

This invention adds to such a resonant charging circuit means for causing the voltage across the network to reverse after each pulse and to be added to the supply voltage, and through recycling, to build up to a high value.

In one embodiment of the invention for supplying high voltage pulses to a load such as a magnetron, a first electronic switch is used for the production of the pulses, and a second electronic switch is used for providing substantially a short circuit across the lead for causing the voltage across the network to reverse so as to be added to the supply voltage. The two switches are triggered simultaneously during the building up of the high voltage, and when the voltage has been built up to the desired value, only the first switch is triggered, the second switch remaining open. This results in the pulses at the desired high voltage being delivered to the load.

In another embodiment of the invention for supplying high voltage, direct current to the anodes of cathode ray tubes and the like, a resistor having a low resistance replaces the load and the second electronic switch of the said first embodiment of the invention, and acts to cause the described voltage reversals across the network. An isolating choke is connected to the network and through it the high voltages are supplied. The resistor may be variable for varying high voltage.

An object of the invention is to provide high voltage pulses from a low voltage source.

Another and more definite object of the invention is to provide in a resonant charging circuit energized by a low supply voltage and including a pulse-forming network means for causing the voltages across the network to reverse at the end of each pulse and to be added to the supply voltage, and for causing, through recycling, the pulse voltage to be built up to a high value.

Figure 2:
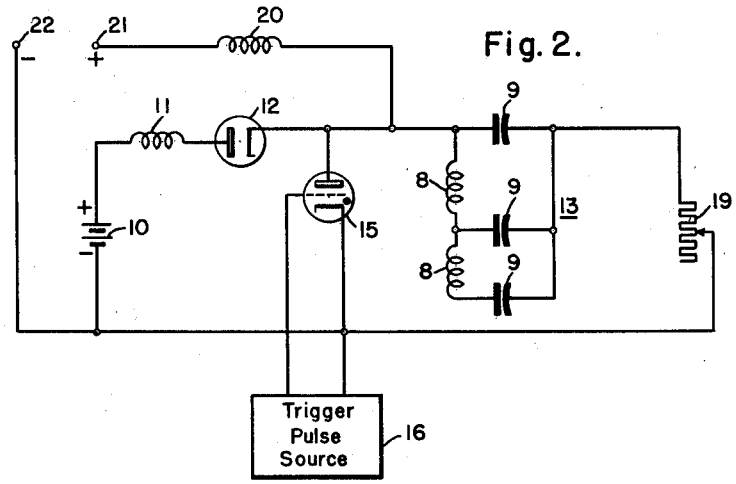

The invention will now be described with reference to the drawing, of which:

Fig. 1 is a circuit schematic of one embodiment of the invention for delivering high voltage pulses to a load such as a magnetron, and Fig. 2 is a circuit schematic of another embodiment of the invention for providing high voltage, direct currents to the anodes of such tubes as cathode ray tubes.

Referring now to Fig. 1, the source of supply voltage illustrated symbolically as a battery 10, is connected in series with the charging inductance 11, the diode tube 12, the pulse-forming network 13, and the primary winding of the pulse transformer 14. The network 13 is a conventional, open-ended, transmission line section having the series-connected inductors 8 and the capacitors 9 connected thereto. The thyratron tube 15 is connected as an electronic switch across the circuit, its plate being connected to the circuit between the diode tube and the network, and its cathode being connected to the circuit between the primary winding of the pulse transformer and the terminal of the battery 10. The trigger pulse source 16 is connected to the control grid and the cathode of the tube 15.

The circuit described so far in connection with Fig. 1 of the drawing, is conventional and is known as a D. C. resonance charging circuit, the network being an open-ended transmission line section. The charging inductance and the capacity in the network are resonant at a frequency of one-half the desired pulse frequency. The surge impedance of the network and of the load are the same.

The trigger pulse source 16 may, for example, comprise a multivibrator such as is described in section 4–5 and shown in Figs. 4–9 of "Ultra-High Frequency Techniques" by Brainerd published by D. Van Nostrand Company, New York city, 1942, which may be arranged to produce periodic positive voltage pulses of duration equal to half the period of oscillation of the network 13 separated by intervals as great as the time taken to charge that network through inductance 11 by source 10.

Immediately following a pulse or when the battery is first connected in the circuit with the tube 15 non-conducting, since the resistance of the LC circuit is low, the circuit will oscillate. The tube 15 is triggered by a positive pulse from the source 16 on its grid, so that it conducts and effectively closes a switch across the circuit at the end of the first half cycle of oscillation for forming a pulse when the voltage across the capacity is at its maximum value which is about twice that of the battery. A current having a voltage equal to one-half this voltage will then flow from the network into the transformer 14. The pulse is initiated when the conduction through the tube 15 begins, and ends when the wave induced in the network is reflected back from its open end to its starting end in proper phase. All of the voltage applied across the network and the transformer primary winding of the load appears across the network as charges in the capacitors 9. At this time there is no voltage across the load and across the tube 15 so that the pulse is terminated and the tube stops conducting and is ready for the next cycle.

It has been known that where there is a mismatch of impedance when a pulse-forming network discharges into a load, a small reverse voltage will appear across the network. Heretofore this has been considered undesirable, and for overcoming this effect, auxiliary diode tubes have been shunted across the thyratrons used as electronic switches and which conduct in only one direction, for leaking off the reverse voltage. This invention utilizes this effect and adds to a conventional D. C. resonant charging circuit, means for producing and using such voltage reversals to build up high voltages from a low voltage source.

This invention adds to the circuit described so far in connection with Fig. 1 of the drawing, the thyratron tube 17 which has its cathode connected to the circuit between the network 13 and the side of the primary winding of the transformer 14 to which it is connected, and which has its anode connected to the other side of the primary winding. The trigger pulse source 18 is connected to the control grid and the cathode of the tube 17.

The source 18 supplies a positive pulse to the grid of the tube 17 at the same time the source 16 supplies a positive pulse to the grid of the tube 15, during a portion of its operation. The tube 17 then conducts, its plate potential being supplied by the voltage drop across the primary winding of the transformer 14, at the same time the tube 15 conducts and the pulse is formed, and forms a substantial short circuit across the primary winding of the transformer. This prevents pulses being supplied to the transformer 14, and results, due to the impedance mismatch, in the voltage across the network reversing and appearing in series with that from the battery. Since this reverse voltage is about twice the battery voltage, the voltage available for producing the next pulse is about three times the battery voltage, and the voltage across the network when the next pulse is formed is about twice this voltage, or about six times the battery voltage.

The plate of the tube 17 obtains its voltage from that built up across the primary winding of the transformer 14. This voltage becomes negative when the voltage across the network reverses at which time the tube 17 ceases to conduct and is ready for the next cycle.

As the recycling continues, the voltage across the network continues to build up until the desired value is reached. At that time, the trigger pulse source discontinues supplying pulses to the grid of the tube which then becomes a shunt high impedance and has substantially no effect upon the circuit. Then upon the next cycle, the high voltage pulse is delivered to the transformer 14, and the network 13 is completely discharged.

The trigger pulse source 18 may, for example, comprise a multivibrator of the type described in the above-mentioned section of the Brainerd book arranged to superimpose on a voltage derived from trigger pulse source 16 a rectangular wave of a lower frequency and negative polarity. The more positive portion of the latter wave is superposed on a sufficient number of positive pulses from source 16 and is of such value that during its continuance the tube 17 is rendered conductive at each positive pulse of source 16. The duration of the more positive phase of the wave of source 18 is made such that the capacitors 9 build up to the desired voltage in the manner described above. The negative portion of the source 18 wave then sets in and is made of such amplitude that the pulses from source 16 are unable to render tube 17 conductive while it endures. Its duration is made sufficient for network 13 to completely discharge through transformer 14 as above described. The next positive portion of the source 18 begins with the start of the next positive pulse of source 16. The tube 17 thus acts as an electronic switch.

The embodiment of the invention illustrated by Fig. 2 of the drawing differs from that illustrated by Fig. 1 in that the variable resistor 19 replaces the tube 17 and the primary winding of the transformer 14. This resistor has a low resistance, providing an impedance into which the network 13 discharges, which is much less than the surge impedance of the network. By reducing the resistance of the resistor, the reverse voltage appearing across the network at the end of each pulse can be increased, and by increasing the resistance of the resistor, the reverse voltage appearing across the network can be reduced.

The isolating choke 20 is connected at one end to the network, and has at its other end the terminal 21 of positive polarity, which may be used with the terminal 22 of negative polarity, connected to the negative terminal of the battery 10 for supplying high voltage, direct current to such devices as cathode ray tubes with which high voltage, low current, anode voltage supply sources are used.

The embodiment of the invention illustrated by Fig. 2 of the drawing, is particularly suited for supplying high voltage to the second anode of a cathode ray tube in a television receiver in which case the trigger pulse source 16 could be one of the synchronizing circuits of the receiver.

While the diode tube 12 has been illustrated by Figs. 1 and 2 of the drawing, this tube can be omitted, especially when the resonant frequency of the charging inductance 11 and of the network 13 has the proper relationship to the repetition rate of the remainder of the circuit.

I claim as my invention:

1. A circuit for generating high direct-current voltage pulses, comprising a low voltage, direct-current source, a pulse-forming network connected in series with said source, means for charging said network from said source, a switch connected across the circuit between said source and one side of said network, means for periodically closing said switch, and means connected across the circuit at the other side of said network for discharging said network for a predetermined time while said switch is closed, said discharging means having an impedance substantially less than the surge impedance of said network whereby at the end of a pulse, the voltage across the network will reverse and appear in series with the voltage of said source.

2. The invention as claimed in claim 1 in which the impedance of the last-mentioned means is nearer zero impedance than to said surge impedance.

3. The invention as claimed in claim 2 in which means is provided for varying the impedance of the last-mentioned means.

4. The invention as claimed in claim 1 in which the last-mentioned means is a switch.

5. The invention as claimed in claim 1 in which the last-mentioned means is a resistor.

6. The invention as claimed in claim 1 in which the last-mentioned means is a variable resistor.

7. A circuit for generating high direct-current voltage pulses, comprising a low voltage direct-current source, a pulse-forming network, means for charging said network from said source, a load element connected to said pulse forming network, a first switch shunted across said circuit between said source and said network, means for periodically closing said first switch to discharge said network, a second switch shunted across said load element, and means operative for a predetermined number of pulses for closing said second switch when said first switch is closed to provide a shunt discharge path for said pulse forming network around said load element, and for then holding said second switch open to cause said pulse forming network to discharge through said load element.

8. A circuit for generating high direct-current voltage pulses, comprising a low voltage, direct-current source; a pulse-forming network; means for charging said network from said source; a load element; a first gaseous electron tube having an anode connected to one side of said circuit between said source and said network, having a cathode connected to the other side of said circuit, and having a control electrode, a first trigger pulse source for supplying voltage pulses between said grid and said cathode for causing said tube periodically to conduct and discharge said network; a second gaseous electron tube having an anode and a cathode connected to the opposite ends of said load element, and having a control electrode, and a second trigger pulse source for supplying voltage pulses between said cathode and said control electrode of said second tube for causing same to periodically conduct when said first tube conducts and provide a shunt discharge path for said pulse forming network around said load element, said second source providing voltage pulses for causing said second tube to become conductive, for a predetermined number of pulses from said network, and for then discontinuing said voltage pulses to said second tube.

9. A circuit for generating high direct-current voltage pulses comprising a low voltage, direct-current source, a pulse-forming network, means for charging said network from said source, a load element, a switch shunted across the circuit between said source and said network, means for periodically closing said switch, means forming a low impedance shunt discharge path for said pulse forming network across said load element, and means operative after a predetermined number of pulses for removing said shunt.

10. A circuit for providing high direct-current voltages, comprising a low voltage, direct-current source, a pulse-forming network connected in series with said source, means for charging said network from said source, a switch connected across the circuit between said source and one side of said network, means for periodically closing said switch, a resistor connected across the circuit at the other side of said network for discharging with said switch, said network, and means connected to said one side of said network for providing direct-current voltages to a load.

11. The invention as claimed in claim 10 in which the last-mentioned means includes an isolating choke.

12. The invention as claimed in claim 10 in which the resistor is variable, and the last-mentioned means includes an isolating choke.

References Cited in the file of this patent

UNITED STATES PATENTS

| Number | Name | Date |
|---|---|---|
| 2,405,069 | Tonks | July 30, 1946 |
| 2,438,962 | Burlingame et al. | Apr. 6, 1948 |
| 2,469,977 | Morrison | May 10, 1949 |
| 2,470,550 | Evans | May 17, 1949 |
| 2,496,543 | Kanner | Feb. 7, 1950 |
| 2,511,595 | Loughren | June 13, 1950 |